United States Patent
Hacker et al.

(10) Patent No.: US 10,654,110 B2
(45) Date of Patent: May 19, 2020

(54) CUTTING TOOL, IN PARTICULAR A BORING BAR, AND METHOD FOR MACHINING A NUMBER OF HOLES

(71) Applicant: Kennametal Inc., Latrobe, PA (US)

(72) Inventors: Michael Hacker, Nürnberg (DE); Sebastian Kunschir, Winklarn (DE)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 15/922,233

(22) Filed: Mar. 15, 2018

(65) Prior Publication Data

US 2018/0272434 A1 Sep. 27, 2018

(30) Foreign Application Priority Data

Mar. 22, 2017 (DE) .................... 10 2017 204 858

(51) Int. Cl.
*B23B 29/02* (2006.01)
*B23B 27/00* (2006.01)

(52) U.S. Cl.
CPC .......... *B23B 29/022* (2013.01); *B23B 27/002* (2013.01); *B23B 2229/04* (2013.01); *B23B 2229/08* (2013.01); *B23B 2250/04* (2013.01)

(58) Field of Classification Search
CPC ... B23B 29/022; B23B 41/12; B23B 2229/08; B23B 2250/04; B23B 2250/16;
(Continued)

(56) References Cited

U.S. PATENT DOCUMENTS 327,146 A 9/1885 Denny
1,910,940 A 5/1933 Toske
(Continued)

FOREIGN PATENT DOCUMENTS

CA 2325061 A1 5/2001
CN 103862110 B 10/2017
(Continued)

OTHER PUBLICATIONS

Machine Translation, WO/2014/195007, Hacker M., et al., Jun. 3, 2014. (Year: 2014).*
(Continued)

*Primary Examiner* — Eric A. Gates
*Assistant Examiner* — Chwen-Wei Su
(74) *Attorney, Agent, or Firm* — Larry R. Meenan

(57) ABSTRACT

The present application relates to a cutting tool (2), in particular a boring bar (2) for machining holes (16) separated from each other in an axial direction (4) by a given spacing distance (a), comprising a main body (10) extending in an axial direction (4) with an axis of rotation (R) with at least one cutting element (12), as well as with a number of guide elements (14) for guiding the main body (10) within a guide hole (16A), wherein the guide elements (14) for the axis of rotation (R) are separated by a guide radius (r1), wherein viewed in a cross-section, the main body (10) is divided into a functional region (19) and an eccentric region (20), wherein the cutting elements (12) and the guide elements (14) are arranged distributed over the circumference of the main body (10) over an angular region (α) of less than 180°.

14 Claims, 7 Drawing Sheets

(58) Field of Classification Search
CPC ... B23B 2229/04; B23B 27/002; B23B 29/02; B23B 29/03; B23D 77/003; B23D 2277/46
See application file for complete search history.

(56) References Cited

U.S. PATENT DOCUMENTS

| | | | |
|---|---|---|---|
| 1,941,790 A | | 1/1934 | Davis |
| 2,074,424 A | | 3/1937 | Petersen |
| 2,187,221 A | | 1/1940 | Brown |
| 2,426,359 A | * | 8/1947 | Lankheet ............ B23B 29/022 408/143 |
| 2,610,529 A | * | 9/1952 | Atkinson ............ B23B 51/0493 408/143 |
| 2,625,065 A | | 1/1953 | Trishman |
| 2,842,014 A | | 7/1958 | Miller |
| 3,191,463 A | | 6/1965 | Ladendort |
| 3,286,557 A | | 11/1966 | Rietzler |
| 3,386,317 A | | 6/1968 | Flick |
| 3,530,744 A | | 9/1970 | Jacobson |
| 3,795,160 A | | 3/1974 | Janiszewski |
| 3,880,545 A | | 4/1975 | Kress |
| 3,935,764 A | | 2/1976 | Janiszewski |
| 3,981,210 A | | 9/1976 | Janiszewski |
| 4,129,400 A | | 12/1978 | Wozar |
| 4,224,846 A | | 9/1980 | Eysel |
| 4,293,252 A | | 10/1981 | Kress |
| 4,294,319 A | | 10/1981 | Guergen |
| 4,425,063 A | | 1/1984 | Striegl |
| 4,596,498 A | | 6/1986 | Kress |
| 4,850,757 A | | 7/1989 | Stashko |
| 5,149,233 A | | 9/1992 | Kress |
| 5,191,864 A | | 3/1993 | Santi |
| 5,486,075 A | | 1/1996 | Nakamura |
| 5,865,573 A | | 2/1999 | Kress |
| 5,906,458 A | | 5/1999 | Planche |
| 5,957,633 A | | 9/1999 | Hall |
| 6,033,159 A | | 3/2000 | Kress |
| 6,254,319 B1 | | 7/2001 | Maier |
| 6,287,057 B1 | | 9/2001 | Kurz |
| 6,379,090 B1 | | 4/2002 | Halley |
| 6,536,997 B1 | | 3/2003 | Kress |
| 6,554,549 B1 | | 4/2003 | Kurz |
| 6,676,338 B2 | | 1/2004 | Kress |
| 7,089,837 B2 | | 8/2006 | Feil |
| 7,114,893 B2 | | 10/2006 | Mast |
| 7,363,692 B2 | | 4/2008 | Kress |
| 7,632,050 B2 | | 12/2009 | Nuzzi |
| 9,789,547 B2 | * | 10/2017 | Hacker ................ B23B 29/02 |
| 2003/0077135 A1 | | 4/2003 | Agarico |
| 2003/0103821 A1 | | 6/2003 | Kress |
| 2003/0175085 A1 | | 9/2003 | Prokop |
| 2004/0096283 A1 | | 5/2004 | Nomura |
| 2005/0169721 A1 | | 8/2005 | Schulte |
| 2006/0045640 A1 | | 3/2006 | Hessman |
| 2007/0237592 A1 | | 10/2007 | Nomura |
| 2008/0152445 A1 | | 6/2008 | Jensen |
| 2008/0193234 A1 | | 8/2008 | Davancens |
| 2010/0054879 A1 | | 3/2010 | Nedzlek |
| 2011/0176878 A1 | | 7/2011 | Nomura |
| 2012/0020750 A1 | | 1/2012 | Bitzer |
| 2012/0039675 A1 | | 2/2012 | Men et al. |
| 2012/0251254 A1 | | 10/2012 | Durand-Terrasson |
| 2013/0004253 A1 | | 1/2013 | Kauper |
| 2013/0078045 A1 | | 3/2013 | Randecker |
| 2014/0169896 A1 | | 6/2014 | Kunschir |
| 2016/0114401 A1 | | 4/2016 | Hacker |

FOREIGN PATENT DOCUMENTS

| | | | |
|---|---|---|---|
| DE | 542338 C | | 1/1932 |
| DE | 1627222 U | | 8/1951 |
| DE | 1922131 U | | 8/1965 |
| DE | 1239911 B | | 5/1967 |
| DE | 2237743 A1 | | 2/1974 |
| DE | 3402551 A1 | | 8/1985 |
| DE | 3419350 A1 | | 11/1985 |
| DE | 3022984 | | 5/1986 |
| DE | 3429498 | | 8/1987 |
| DE | 255679 | | 4/1988 |
| DE | 3820485 C1 | | 8/1989 |
| DE | 3316053 | | 6/1992 |
| DE | 3842437 C2 | | 8/1992 |
| DE | 19720823 A1 | | 11/1998 |
| DE | 19721997 | | 12/1998 |
| DE | 102005017285 A1 | | 10/2006 |
| DE | 102006024569 A1 | | 12/2007 |
| EP | 0970770 | | 1/2000 |
| EP | 771602 | | 2/2001 |
| EP | 0970770 | | 6/2002 |
| EP | 1561535 | | 1/2012 |
| EP | 2745967 A1 | | 6/2014 |
| GB | 2075383 A | | 11/1981 |
| JP | 01306122 | | 12/1989 |
| JP | H02190215 A | | 7/1990 |
| JP | 2001121319 A | | 5/2001 |
| JP | 2007098511 A | * | 4/2007 |
| JP | 2008168393 A | * | 7/2008 |
| WO | WO-0245892 A1 | * | 6/2002 ........... B32B 29/022 |
| WO | WO2005061164 | | 7/2005 |
| WO | WO2011142370 A1 | | 11/2011 |
| WO | WO2014195007 A1 | | 12/2014 |

OTHER PUBLICATIONS

Jul. 20, 2018 Search report.
Aug. 3, 2018 Office Action (non-US).
Feb. 7, 2018 First Office Action.
Oct. 19, 2015 Office Action.
Aug. 22, 2017 Notice of Allowance.
Jan. 22, 2019 Office Action.
Nov. 9, 2018 Advisory Action.
Oct. 15, 2018 Advisory Action.
Aug. 6, 2018 Final Office Action.
Apr. 3, 2018 Office action.
Jun. 12, 2017 Second Office Action.
Apr. 7, 2017 Office action.
Feb. 16, 2017 Second Office Action.
Jan. 26, 2017 Office action.
Nov. 28, 2016 First Office Action.
Jun. 18, 2014 Search Report and Written Opinion.
Oct. 13, 2014 Search Report.

* cited by examiner

CUTTING TOOL, IN PARTICULAR A BORING BAR, AND METHOD FOR MACHINING A NUMBER OF HOLES

RELATED APPLICATION DATA

The present application claims priority pursuant to 35 U.S.C. § 119(a) to German Patent Application Number DE 102017204858.1 filed Mar. 22, 2017 which is incorporated herein by reference in its entirety.

FIELD

The invention relates to a rotating cutting tool, in particular a boring bar, as well as a method for machining a number of holes that in particular are separated from each other in an axial direction by a given spacing distance, with the assistance of such a cutting tool.

BACKGROUND

Such a boring bar as well as such a method are for example described in WO 2014/195007 A1.

Bearing shafts such as camshafts or crankshafts in motor vehicles are normally supported in bearing holes, hereinafter termed holes for short, on a plurality of bearing supports that are axially separated from each other. At the same time, the individual holes are normally bored to a final dimension with the assistance of a so-called line boring bar. This has blades that are offset from each other in an axial direction by the spacing distance and are each provided for machining a corresponding hole so that a plurality of holes can be machined simultaneously by means of such a line boring bar by the blades separated from each other in an axial direction.

Working positions that each have a blade are therefore disposed on the boring bar at locations corresponding to the distance between the holes. Normally, only one blade is present for each working position.

For the boring process, the boring bar must be guided or supported. Directly supporting the boring bar by means of guide elements in the region of the corresponding blades, as is known for example with reamers, is not readily feasible in this regard since the boring bar must first be inserted through the rough, yet-to-be machined holes.

Consequently a solution for supporting the boring bar is described in WO 2014/195007 which originates from the applicant, i.e., in particular an alternatively-designed boring bar by means of which efficient machining of holes that are aligned with each other is enabled. For this purpose, the boring bar has a main body with an axis of rotation and a plurality of cutting elements separated from each other in an axial direction, as well as in addition at least one guide element for guiding the main body within a guide hole, wherein the guide elements are separated from the axis of rotation by a guide radius. The main body is furthermore divided into a functional region and an eccentric region, wherein the cutting elements as well as the guide elements are distributed about the main body over an angular range of less than 180°. In addition, the circumferential face of the main body in the eccentric region is at a distance from the axis of rotation that is less in comparison with the guide radius so that the main body can be guided eccentrically through a corresponding hole with an unmachined rough radius that is less than the guide radius.

According to a preferred development, the arrangement of a balance element is additionally provided, wherein the balance element forms a component of the main body that accordingly can be divided into a basic body and the least one balance element. With each balance element, an imbalance that otherwise exists is at least partially compensated, and improved concentricity is achieved. For this, the balance element is typically produced from a different material than the basic body, in particular a material with a greater density in comparison to the material of the basic body.

SUMMARY

On this basis, the aim of the invention is to present an advantageously designed cutting tool, and to enable easy machining, in particular of workpieces with holes separated from each other in an axial direction by a given spacing distance.

This aim is achieved according to the invention by a cutting tool having the features of claim 1, as well as by a method with the features of claim 8. Preferred developments are presented in the dependent claims. The presented advantages and preferred embodiments with regard to the cutting tool also correspondingly apply to the method, and vice versa.

The starting point for the invention in this regard is a cutting tool according to the aforementioned WO 2014/195007 with a basic body and with a balance element, wherein, as already mentioned above, the balance element and the basic body are typically produced from different materials or substances, and wherein the balance element is typically produced from a material with a greater density than the basic body.

In this context, the cutting tool according to the invention is designed so that it has very special deformation properties that are dictated by the design. The special design of the balance element and the basic body described below ensure that the deformation arising in use of the cutting tool presented here causes a cutting edge of a blade of the cutting tool, viewed in a cross-section, to shift essentially in a direction perpendicular to a midplane. Accordingly, it is ensured in particular that the corresponding cutting edge does not shift parallel to the midplane and, viewed from the cutting edge, does not in particular shift radially inward in the direction of the axis of rotation. Accordingly, what amounts to a defined deformation direction is specified that in particular also advantageously affects the precision of the cutting tool.

The cutting tool in this regard is in particular designed as a boring bar and comprises a main body extending in an axial direction with an axis of rotation running parallel to the axial direction with at least one cutting element, as well as with a number of guide elements to guide the main body within a guide hole. At the same time, the guide elements for the axis of rotation are separated by a guide radius, and the main body, viewed in a cross-section, is divided into a functional region and an eccentric region. Moreover the cutting elements as well as the guide elements are distributed over the circumference of the main body by an angular range of less than 180°, and the circumferential face of the main body has a distance to the axis of rotation in the eccentric region that is less in comparison with the guide radius. Furthermore, the main body has the aforementioned basic body as well as the at least one balance element that is positioned within the eccentric region and is designed to at least partially balance an otherwise existing imbalance. In this context, the cutting tool is designed to dictate the desired deformation direction such that a parting plane is formed between the basic body and the balance element which is at least oriented substantially parallel to the aforementioned midplane that is defined by the axis of rotation and the aforementioned cutting edge of a cutting element, i.e., of the at least one cutting element.

"At least substantially parallel" is understood in this context to mean a tolerance range of up to a ±10°, and preferably only up to a ±5° tilt relative to a precisely parallel alignment. More preferably, the parting plane is aligned precisely parallel.

In this regard, each parting plane is generally an imaginary plane that separates the two geometric bodies, i.e., the basic body and the balance element, from each other, and at which these two bodies are connected to each other. In this context, the parting plane is typically defined by the contact surface with which the balance element abuts onto the basic body, and by means of which the balance element is attached to the basic body, for example by adhesion. Whereas however the parting plane always forms a plane in a mathematical sense, depending on the design of the cutting tool, the contact surface is not necessarily formed by a mathematical plane but rather for example by a structured surface that for example has grooves, a wavy profile or another geometry for the purpose of providing toothing, and/or for better fixation, and/or for the sake of easier positioning during assembly.

The blade edge or cutting edge in turn is generally formed by a corner of a blade of the cutting element of the cutting tool. In a broader sense however, a given point, in particular a pronounced point, along a corresponding blade forms the blade edge or cutting edge. Preferably, the cutting edge in this context forms the radially outermost point of the blade.

Moreover, it is advantageous when the cutting tool has at least two or precisely two guide elements and is designed such that, viewed in a cross-section, a (surface) normal to the parting plane or to the midplane that runs through the axis of rotation forms an angle bisector of the angle between the positions of the two guide elements. In this manner, inter alia a reliable concentric support for the cutting tool is achieved. The embodiment of the guide elements, i.e., in particular the geometric design and the positioning relative to the basic body, preferably corresponds in this context to one of the design versions described in WO 2014/195007. This analogously also holds true for the at least one cutting element, for the balance element, for the basic body and/or for the overall main body.

Accordingly, an embodiment of the cutting tool is preferred, inter alia, in which the balance element is flush with the basic body on the circumferential face. Viewed in the circumferential direction, the balance element and basic body therefore transition into each other preferably without a sharp bend or step. At the transition point, the balance element and the basic body therefore preferably have the same radius. At the same time, the maximum extension of the balance element in a radial direction preferably corresponds to the maximum radius of the eccentric region.

In a preferred embodiment, the overall balance element, viewed in a cross-section, is designed as a circle segment. Corresponding to this, the basic body is also designed as a circle segment. The balance element in this context is formed in particular within the eccentric region. The balance element and basic body are therefore connected to each other on flat sides that are flattened relative to each other. This enables a large-area attachment of the balance element to the basic body. The circle segment defined by the balance element in this context is normally smaller than the basic body. At the same time, viewed in a cross-section the basic body is for example 60% to 80% of the overall cross-sectional area of the main body. The balance element takes up the remaining portions of the surface.

In order to achieve the desired balancing of the imbalance, the balance element and the basic body preferably consist of different materials that differ in terms of their density. In particular, the balance element consists of a heavier material than the basic body in this context. Accordingly, the cross-sectional surface regions absent from the eccentric region are thereby at least largely compensated by the greater density with regard to the mass distribution. The material for the balance element is preferably a heavy metal. In contrast, the basic body preferably consists of a lighter material, in particular a tool steel.

In a preferred development, an energy absorption element, formed to dampen vibration energy, is also created by the arrangement of the balance element. By providing the separate balance element, an additional way is therefore created of providing a damping element to absorb vibration energy, and a build-up of vibrations is consequently prevented or at least reduced. The design as an energy-absorbing element can for example be achieved by a special embodiment of the balance element itself. For example, the special material selected for the balance element acts to dampen vibration since it consists of a heavier material. Such a material is in principle advantageous for low-vibration concentric running.

In a useful embodiment, the balance element is in particular bonded to the basic body for the purpose of forming the energy absorption element. On the one hand, a reliable attachment is achieved by the adhesion. Moreover, the particular advantage is achieved in that the adhesive that has a certain elasticity converts the kinetic energy for example from flexural or torsional vibrations into internal frictional heat which accordingly dampens the vibration energy.

Furthermore, an embodiment of the cutting tool is envisaged in which the basic body or the main body is divided in an axial direction into at least two parts that are reversibly connectable with each other, and wherein preferably each of the parts has at least one cutting element and/or a guide element.

Just as in WO 2014/195007, the cutting tool is in particular a boring bar with a plurality of blades or cutting elements spaced from each other in an axial direction, i.e. for example a boring bar or line boring bar of the type described above. The inventive principle described here can however also be transferred to other rotating cutting tools with for example only one axial cutting position. Accordingly, the cutting tool is alternatively for example designed as a so-called guide strip tool in which at least one guide element as well as a cutting element lie on an at least approximately equivalent cutting radius and guide radius, or the cutting tool is designed as a single-lip reamer. The invention will be further explained below in relation to a boring bar without loss of universality.

The boring bar in this context generally serves to machine holes that are separated from each other in an axial direction by a given spacing distance, and accordingly, preferably corresponding to the spacing distance of the holes, a number of working positions with one blade each are formed on the boring bar. Normally only one blade is formed per working position in this context, wherein typically, each of these blades is formed by a separate cutting element. Here, the holes are typically separated from each other by several centimeters, and the overall length of the boring bar is normally a multiple of 10 cm, for example up to 50 cm or even more.

The boring bar moreover has a main body extending in an axial direction with an axis of rotation running parallel to the axial direction about which it rotates when operating during the actual boring process with the assistance of, for example, a tool spindle. As already mentioned, typically a plurality of working positions offset relative to each other in an axial direction are formed on the main body, and each has a cutting element or cutting body. In addition, at least one guide position is also formed on the main body with at least one, preferably however two, guide elements. During the machining procedure, the boring bar is then at the guide position supported within a guide hole by the guide elements.

In this context, both the cutting elements as well as the guide elements are normally attached to the main body as separate bodies. The guide elements are typically designed as guide strips. A corresponding cutting body is normally a cutting insert consisting of a hard metal, boron nitride, or another conventional cutting material that for example is screwed to the main body. The guide strips are typically also made of such a material and are for example designed as bonded-in or soldered-in hard metal strips. As an alternative to separate guide elements, the at least one guide element is formed by the main body itself, wherein in this case, for example, the circumferential face of the main body forms the guide element. Here, the guide elements lie on a guide radius with respect to the axis of rotation, and the cutting elements lie on a cutting radius with respect to the axis of rotation. The guide radius and the cutting radius are typically the same size, or approximately the same size in this case.

The main body is then divided into a functional region having the functional elements, i.e., in particular the guide elements as well as the cutting elements, and an eccentric region, wherein the functional region and hence the functional elements only extend over an angular range of less than 180°. At the same time, a circumferential face of the main body in the opposite eccentric region has a smaller distance from the axis of rotation in comparison with the guide radius.

Given this accordingly somewhat retracted main body in the eccentric region in conjunction with the arrangement of the functional elements on only one half of the main body, it is therefore possible to guide the boring bar overall eccentrically, i.e., radially offset with respect to the axis of rotation, through the respective holes, wherein their boring radius is smaller than the guide radius. At the same time, however, a direct support of the boring bar at the working position, i.e., directly in the region of the blade, is ensured during the actual boring process.

In this regard, this embodiment is based on the consideration that a reliable concentric support of the boring bar is achieved when the guide elements reliably support the boring bar within a circumferential region in which the boring bar is displaced due to the cutting forces arising during the boring process. "Concentric support" is understood in this context to mean that the axis of rotation coincides with the hole axis. Given the functional elements arranged only on one side, an escape area can be created on the opposite "free" circumferential face to enable a suitable eccentric introduction of the boring bar into the holes, and then the actual parallel machining process for a plurality of bearing holes can be carried out with effective support.

This basic principle in which all of the functional elements of the cutting tool that more or less form a disruptive contour, i.e., the cutting elements and guide elements, lie within an angular range of less than 180°, combined with the special design of the main body that is more or less flat within the eccentric region, thus always enables an eccentric introduction into as well as removal from a hole, and at the same time a centered machining of the hole. Eccentric withdrawal prevents damage to the machined hole surface when withdrawing the cutting tool from the hole. Consequently, this basic inventive principle is also advantageous with guide-strip tools in which no axially offset cutting elements are arranged.

Preferably in this context, the circumferential face of the main body runs in the eccentric region along an arc line, in particular along a circular arc line. Here, the midpoint of this arc line is arranged at an axis of insertion that is arranged eccentrically to the axis of rotation. It is in particular shifted relative to the axis of rotation into the functional region. Given the especially circular arc-like embodiment, the eccentric region is formed by a semicircle, viewed in a cross-section or plan view, with its midpoint offset into the functional region to form the necessary free space. Instead of a circular arc line, another contour is also possible in principle, in particular for example an elliptical circumferential contour in the eccentric region.

In a useful embodiment, the circumferential face of the main body in the functional region also runs along a (circular) arc line. The contour of the circumferential face of the main body can therefore be approximated in this special design version by two circular arc lines with midpoints that are each offset toward the other region.

According to a first design version, the guide elements are separated in an axial direction from the cutting elements and are in particular arranged on a free end-face without a cutting element being arranged at the axial position of the guide elements. In this version, the boring bar is first introduced eccentrically through the holes until the guide position with the guide elements is inserted into a guide hole that is preferably machined beforehand to a final dimension. The other holes are then machined with the cutting elements. In this embodiment, the individual working positions and hence the individual cutting elements are preferably each offset equidistantly relative to each other in an axial direction by the same spacing distance as established by the spacing distance of the holes. This ensures a parallel, simultaneous machining of the individual bearing holes.

In a preferred alternative embodiment, the guide elements are arranged at an identical axial position to one of the cutting elements so that the working position and guide position coincide and form a combined guide working position on the boring bar. The cutting element of the guide working position, or more precisely its blade, is temporarily arranged in an axial direction relative to the blades of the other working positions or the given spacing distance. This enables a two-step machining method in which the blade of the guide working position first machines a bearing hole into a guide hole in a first machining step. The boring bar is guided and supported in this context in the hole to be machined with the assistance of guide elements that are arranged here at the same axial position as the cutting element or offset slightly to the rear of the cutting element as is routine in machining procedures with single-lip reamers. Then in a second machining step, the other holes are machined at same time with the same cutting elements while the boring bar is supported by the guide elements in the formed guide hole. A separate machining of the guide hole is thus no longer necessary, and a work step is saved.

In this context, it is usefully provided that the guide elements extend over an axial length that is dimensioned such that they support the main body within the guide hole for as long as the other holes are being machined. During the machining procedure, the guide hole is initially formed before the blades of the other working position engage with the holes associated with them. When machining these other holes, the main body is supported within the guide hole by the elongated guide elements.

Preferably, the guide working position is formed in a middle region of the main body. In particular with very long overhangs of the boring bar, this yields a middle support and hence effective concentric guidance while machining the guide hole.

Given the design of the eccentric region, the main body does not have a circular geometry viewed in a cross-section which would in principle lead to an imbalance in a rotation about the axis of rotation. In order to at least reduce this imbalance, the arrangement of the balance element is, however, provided as already mentioned. This balance element in this context forms a component of the main body that can accordingly be divided into a basic body and into the at least one balance element. This at least partially compensates for the inherent imbalance and achieves improved smooth running.

It is always also possible in this context to arrange a middle part of the cutting tool so as to be exchangeable by means of two disconnection points.

According to another alternative embodiment version of the cutting tool, the cutting tool has a basic body that extends starting from a coupling up to an end face on a free end in an axial direction, as well as a balance element that only extends over a partial region of the basic body in an axial direction and in particular terminates at a distance from the end face. Accordingly, the free end of the cutting tool, i.e., the section of the cutting tool following the end face opposite the axial direction, is free of balancing mass, and consequently, the local center of mass of the cutting tool lies in the region of the free end offset from the axis of rotation of the cutting tool. A centrifugal force then acts on the corresponding local center of mass during use of the cutting tool, and consequently the cutting tool bends, wherein the free end bends outward radially starting from the axis of rotation and accordingly may be pressed against a hole wall. In this manner, a kind of pretensioning for the cutting tool is therefore intentionally realized. This finally leads to the actual goal, namely a very secure bearing of the tool, i.e., of the cutting tool within the accommodating hole, i.e., the tool is prevented from lifting away from the hole wall, which in turn contributes to the extreme robust and precise operation of the tool system. At the same time, the high balance quality is retained in the region of the tool that is not directly supported.

The underlying concept here is considered an independent inventive approach, and the submission of an application that addresses it is hereby expressly reserved. The approach is moreover in principle independent of the alignment of the parting plane between the basic body and the balance element, and therefore can also be transferred to embodiments of the cutting tool that are described in WO 2014/195007 originating from the applicant.

Advantageously, the balance element in this context is unreleasably connected to the base body and is, for example, bonded to the basic body to accomplish this.

In most applications, the free end of the cutting tool free of balancing mass extends in this context beyond an extension in an axial direction that preferably corresponds to at least 5%, more preferably at least 10%, and in particular at least 20% of the overall extension of the basic body.

Typically, the free end of the cutting tool free of balancing mass also extends in this case beyond an extension in an axial direction that preferably corresponds to at most 50%, more preferably at most 30%, and in particular at most 20% of the overall extension of the basic body in an axial direction.

According to an advantageous development, the balancing mass extends approximately over the entire length of the basic body in an axial direction; however, this balance element is designed in two parts, wherein a first part or a first partial section starting from the coupling extends in an axial direction up to the free end of the boring bar, and wherein the second part or second partial section extends beyond the free end and terminates at the end face. The first partial section in this context is preferably unreleasably connected to the basic body and is for example bonded thereto. The second partial section arranged on the free end is in contrast releasably connected to the basic body, i.e., screwed thereto, for example. Accordingly, the second partial section of the balance element can be removed at any time as needed and thus free balancing mass from the free end.

The preferred extensions in an axial direction of the second partial section of the balance element arranged on the free end preferably correspond here to the aforementioned extensions in an axial direction of the free end of the cutting tool freed from balancing mass.

BRIEF DESCRIPTION OF THE DRAWINGS

Exemplary embodiments of the invention are explained in greater detail on the basis of the figures, each of which consists of a simplified schematic representation:

FIGS. 1A, B a partially cutaway side view, at the beginning and the end of a machining procedure, showing a boring bar that is introduced into a plurality of mutually separated holes, FIG. 2 a view of the end face of the boring bar, FIG. 3 a view of the end face of a hole to be machined with a boring bar located inside said hole when the boring bar has been inserted eccentrically into the holes, FIG. 4 a representation similar to FIG. 3, wherein however the boring bar in this case has slid into a central machining position in which the actual boring process occurs, FIGS. 5A-C representations of a boring bar inserted into holes according to a second embodiment version for illustrating a two-step machining process, wherein

Parts having the same effect are given the same reference symbols in the figures.

DETAILED DESCRIPTION

Figure 1A:
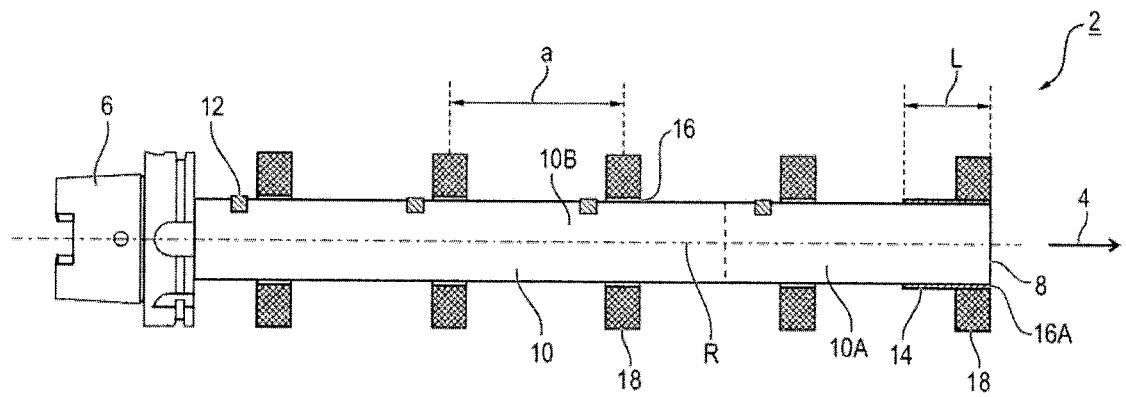

According to the two embodiment versions that can be found in FIGS. 1A, 1B and FIGS. 5A, 5B, 5C, a boring bar 2 also designed as a line boring bar extends in an axial direction 4 from a rear coupling 6 to a front end-face 8. Following the coupling 6, the boring bar 2 has a rod-shaped main body 10 to which cutting elements 12 that are axially separated from each other are attached at a respective working position on the main body 10. In this context, all cutting elements 12 are arranged on the main body 10 at the same angular position and therefore lie on a line. Only one cutting element 12 per working position is arranged on the main body 10. Moreover, guide elements 14 designed like guide strips on the main body are arranged at a guide position of the main body 10. The cutting elements 12 and guide elements 14 form functional elements.

Alternatively to the shown versions with the position of the cutting elements 12 at identical angular positions, the functional elements, in particular the cutting elements 12, are arranged at different axial positions at different angular positions. These serve in particular to reduce a tendency to vibrate. The cutting elements 12 in this context are preferably only offset by a few degrees (such as less than 10°) with reference to a specified target angular position.

Figure 1B:
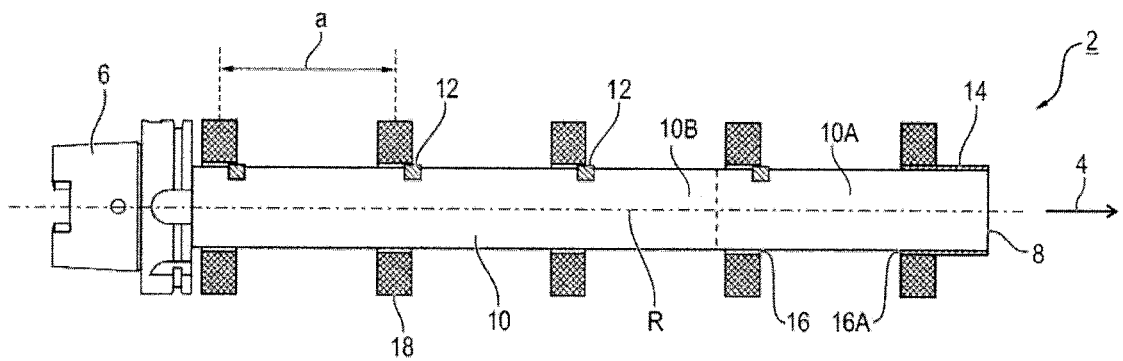

FIGS. 1A, 1B moreover show an optional embodiment version in which the main body 10 is divided into two parts 10A, 10B by a reversibly releasable disconnection point. The disconnection or coupling point is only shown as a dashed line in the figures. The two parts 10A, 10B connect to each other here in an axial direction 4. The coupling point can always be arranged after the guide elements 16 in an axial direction 4 so that they are thus associated with the rear part 10B. For example, the coupling point or another disconnection point is formed at the front end-face shown in FIG. 1A, 1B so that a (another) part can be attached to this end face.

The boring bar 2 generally serves to simultaneously machine a plurality of holes 16, in particular a bearing hole, for example for a crankshaft or camshaft. In this context, the individual holes 16 are present in bearing supports 18 of a bearing housing that are separated from each other by a specific spacing distance a. Normally, adjacent bearing supports 18 are separated from each other by the same spacing distance a. The individual bearing supports 18 and hence also the respective working positions can always have different spacing distances a relative to each other. The spacing distance a typically lies within a range of several centimeters, for example within a range of 5 cm to 20 cm, depending on the engine and the cylinder size. In the exemplary embodiment, five bearing supports 18 are shown. Depending on the engine design, there could be more or fewer of them. All of the holes 16 are aligned with each other and therefore have a common hole axis B that typically coincides with an axis of rotation R of the boring bar 2 in the machining state. The boring bar 2 rotates about the axis of rotation R during the machining process.

To machine the holes 16, the general procedure is to first introduce the boring bar 2 into the holes 16 in an axial direction 4 until the individual cutting elements 12 are each positioned in front of the holes 16 associated with them. To enable the insertion of the boring bar 2, it is inserted eccentrically into the holes 2 as explained in greater detail below. In so doing, the axis of rotation R is arranged offset from the hole axis B. Then the actual machining process starts. To accomplish this, the boring bar 2 is again aligned concentrically with the boring axis B so that the boring axis R and the axis of rotation R at least approximately coincide again. The actual machining process then occurs by rotating the boring bar 2 about the axis of rotation R while the individual cutting elements 12 engage with the respective hole 16. During this machining, the boring bar 2 is supported by the guide elements 14 in one of the holes 16, hereinafter termed guide hole 16A.

Figure 2:
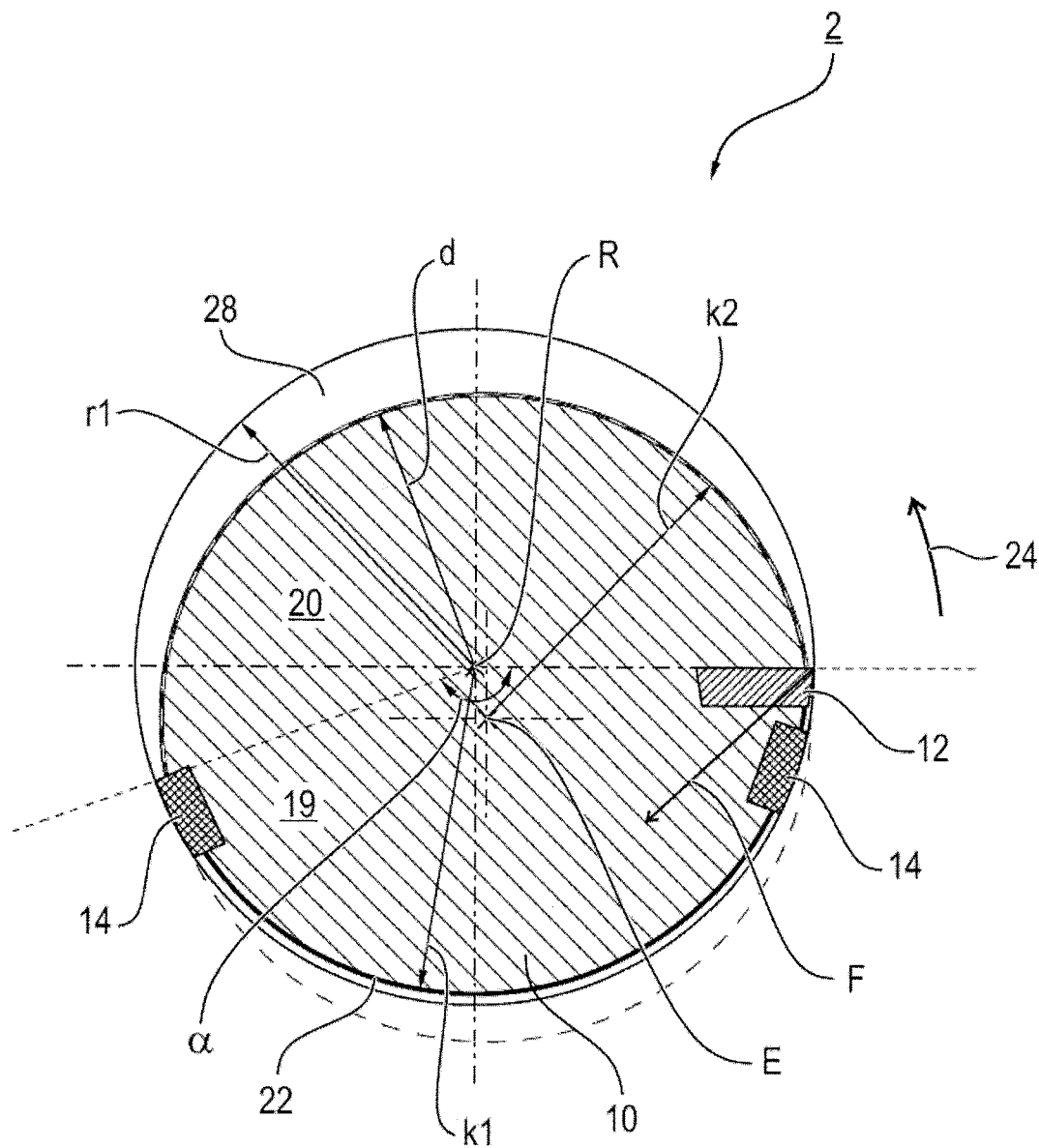

To enable this basic working process, i.e., eccentric insertion with subsequent central alignment and initiation of the boring process, the cutting elements 12 and guide elements 14 are arranged at specific angular positions on the main body 10. The special arrangement as well as the functional principle will be explained in greater detail below with reference to FIGS. 2 to 4:

FIG. 2 shows a view of an end face of the boring bar 2 with precisely two guide elements 14, as well as the front cutting element 12, against which the other cutting elements 12 abut in an axial direction 4 at the identical angular position.

The main body 10 is divided more or less into two halves, wherein one bar half forms a functional region 19, and the other bar half forms an eccentric region 20. All of the functional elements, i.e., the guide elements 14 as well as the cutting element 12 that forms a disruptive contour during insertion, are arranged within the functional region 19 distributed over a circumferential face 22 of the main body 10 over an angular range α. The angular range α here is less than 180°. In the shown exemplary embodiment, these three functional elements extend over an angular range α of about 160°. Whereas one guide element 14 is arranged in the direction of rotation 24 directly after the cutting element 12 at an angular distance of for example 10° to 20°, the second guide element 14 is arranged for example at the end of the angular range α at an angular distance to the cutting element 12 within a range of for example 130 to 160°.

The two guide elements 14 in this context are arranged so that a resulting force component F that acts on the main body 10 during the cutting process is oriented within the region between the two guide elements 14. This guarantees that the guide elements 14 are pressed against a hole wall 26 during the machining process to ensure a concentric guidance of the boring bar 2.

The guide elements 14 are separated from the axis of rotation R by a guide radius r1. The radially outermost point of the cutting element 12 defines the blade that preferably identically lies on the same guide radius r1. In some embodiment versions, the blade can also be radially offset somewhat to the inside in order to exert a radial pretension on the guide elements 14.

The main body 10 itself has a contour that deviates from the circular shape. In the exemplary embodiment, the main body 10, viewed in a cross-section, is composed of at least approximately two circle segments shifted relative to each other. In the functional region 19, the circumferential face 22 therefore runs along a circular arc line about the axis of rotation R with a first circle radius k1. In the eccentric region 20, the circumferential face 22 contrastingly runs along a second circular arc with a second circle radius k2 about an axis offset from the axis of rotation R that will hereinafter be termed the insertion axis E. As can be seen in particular in FIG. 2, the insertion axis E is arranged offset in a radial direction to the axis of rotation R, wherein it is shifted into the functional region 19. In comparison with the guide radius r1, this significantly reduces a distance d from the axis of rotation R to the circumferential face 22 (in particular measured at a position in the middle of the angular region (360°−α) of the eccentric region 20) so that an approximately crescent-shaped free or escape area 28 is formed following the eccentric region 20. The guide radius is for example 10-30% larger than the distance d. In FIG. 2, a circle with the second circle radius k2 is shown in a dashed line around the insertion axis E for the sake of illustration. At the same time, a guide circle with the guide radius r1 is shown as a solid circular line around the axis of rotation R.

Figure 3:
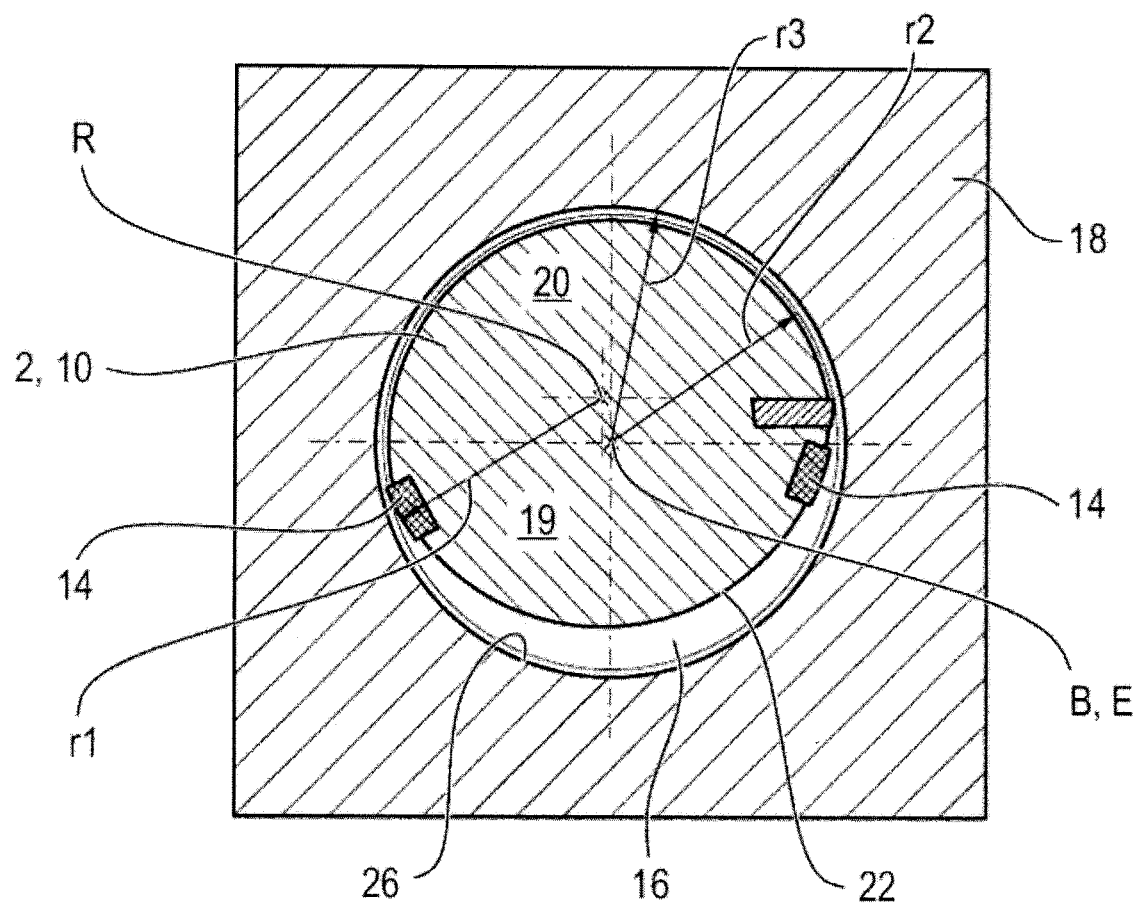

Given the formed escape area 28, the main body 10 can be moved radially toward this escape area 28 in order to insert the boring bar 2 into the holes 16 so that the boring bar 2 with the cutting elements 12 and the guide elements 14 can be guided through. This insertion process will be explained with reference to FIG. 3:

To insert the boring bar 2 through the holes 16, the boring bar 2 is guided through the holes 16 along the insertion axis E eccentric to the hole axis B. The contour and dimensions of the eccentric region 20, in particular that of the circumferential face 22 in the eccentric region 20, are selected to ensure in such an eccentric infeeding that the individual functional elements 12, 14 have a free access to the hole wall 26 of the unmachined hole 16. The hole 16 in the unmachined initial state has a rough radius r2 which is represented in FIGS. 3 and 4 by a guide line.

Figure 4:
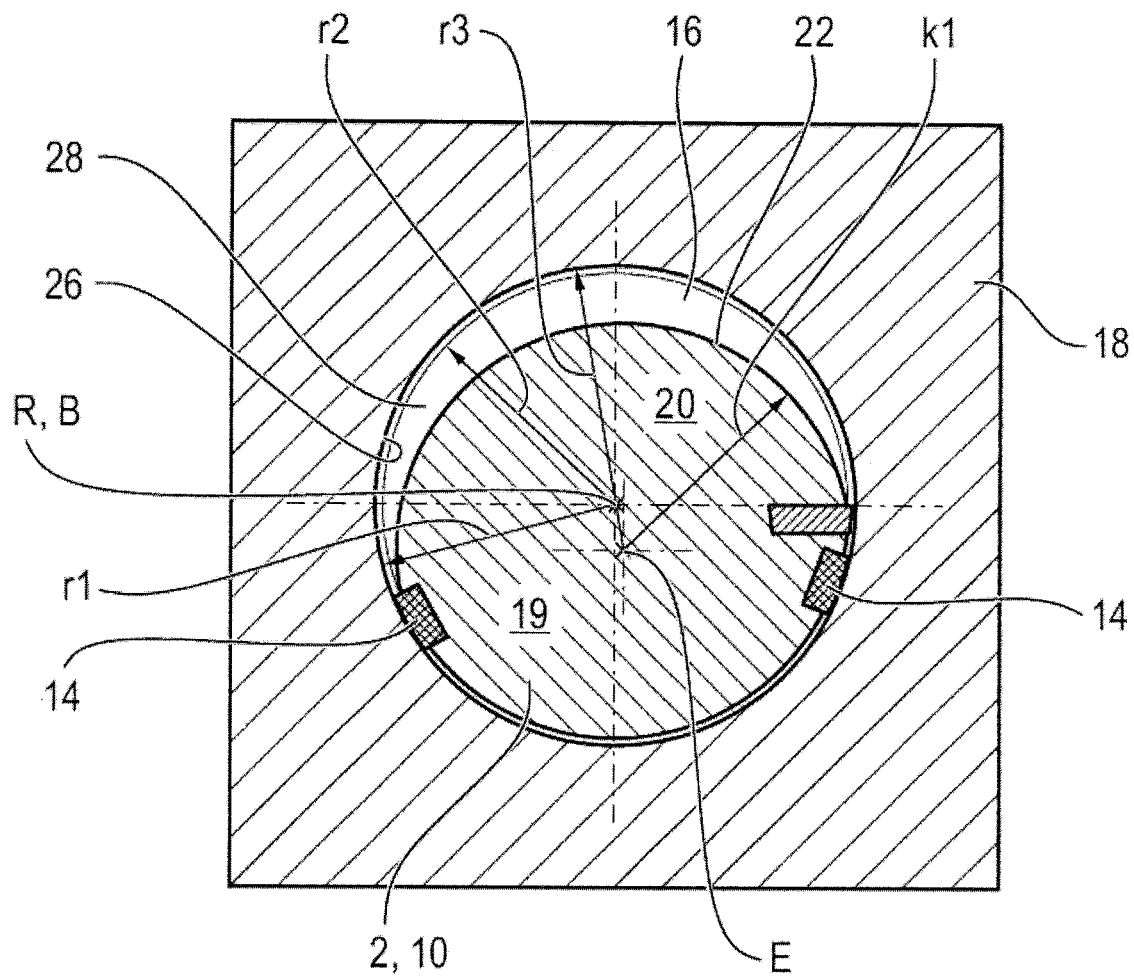

For machining, the boring bar 2 is then recentered, i.e., moved radially, so that the hole axis B and the axis of rotation R coincide with each other as shown in FIG. 4. The machining process is then carried out in this state. For this, the boring bar 2 is made to rotate in the direction of rotation 24 about the axis of rotation R so that the respective cutting element 12 machines the hole inner wall 26 and bores out to a final radius r3.

Concentric guidance of the boring bar 2 is achieved by the guide elements 14: To ensure a concentric guidance of the boring bar 2 that is as precise as possible, the guide elements 14 are preferably arranged somewhat eccentrically relative to the axis of rotation R, or are arranged on a somewhat larger radius as described in DE 10 2012 223 183 A1. Reference is therefore made to the entire subject matter disclosed in this application which is hereby included.

Alternatively or in addition thereto, a so-called alignment adapter is used. This is arranged intermediately between a toolholder (spindle) of a machine tool and the cutting tool. The alignment adapter accommodates the coupling 6 of the cutting tool. This can be moved or tilted in a radial direction within the alignment adapter optionally or in combination, depending on the embodiment version of the alignment adapter. Overall, this enables a concentric guidance and adjustment of the boring bar 2.

Figure 5A:
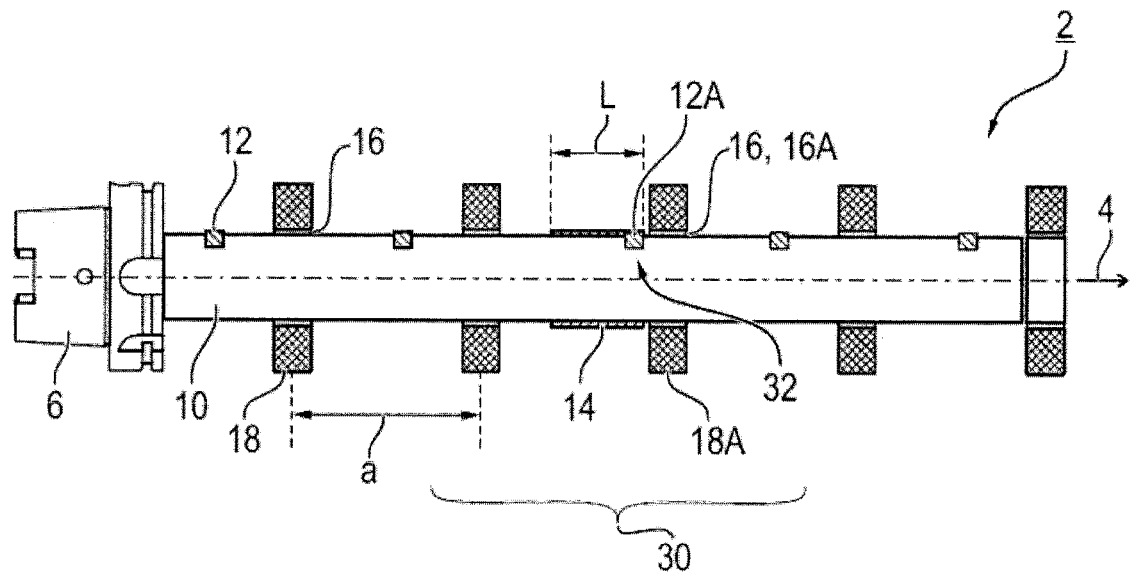
FIG. 5A shows a position of the boring bar before machining a hole into a guide hole.
Figure 5B:
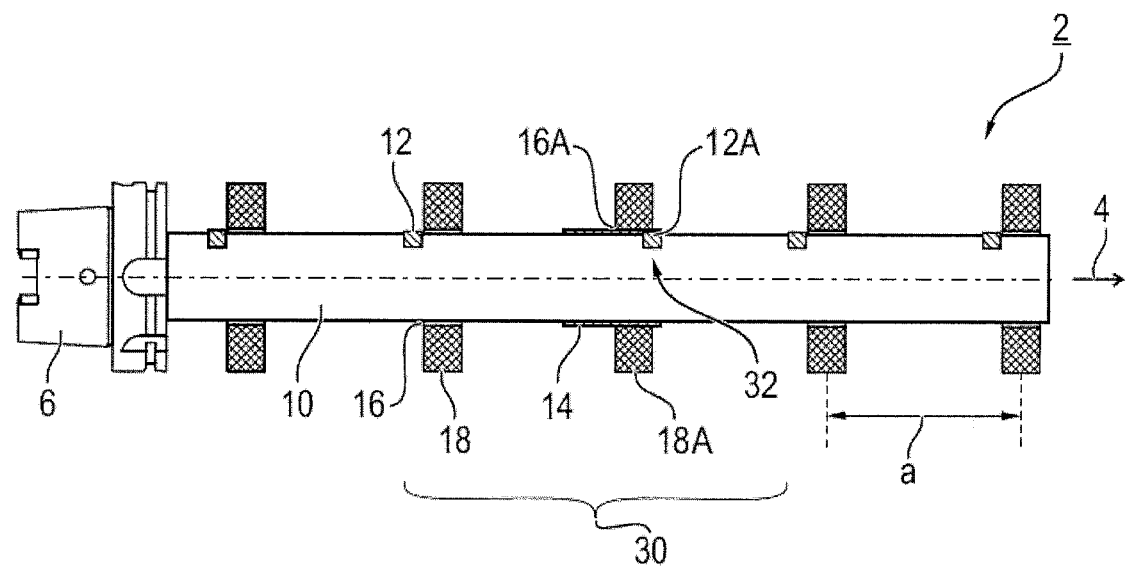
FIG. 5B shows an intermediate position before starting the machining of the other holes.
Figure 5C:
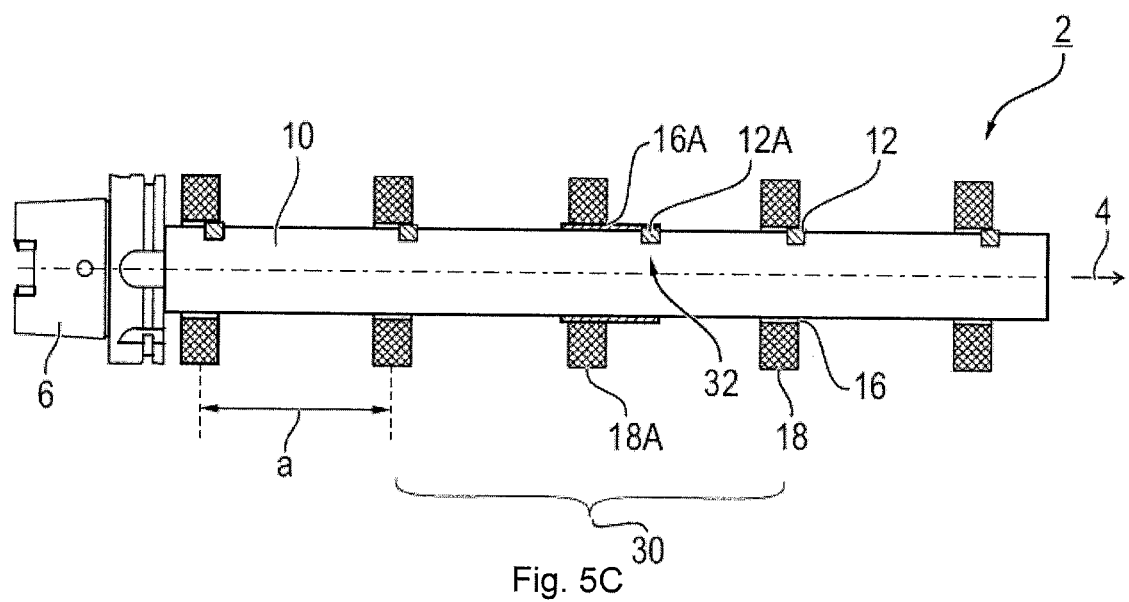
FIG. 5C shows an end position after machining the holes, FIG. 6 another representation comparable to FIG. 2 of another embodiment version with a balance element, FIG. 7 an alternative embodiment version of the boring bar with a balance element in a partially cutaway side view, and FIG. 8 a second alternative embodiment version of the boring bar with a balance element in a partially cutaway side view.

The basic principle described in FIGS. 2 to 4 is realized both in the first embodiment version according to FIGS. 1A, 1B as well as in the second embodiment version according to FIGS. 5A-5C.

In the first embodiment version, the guide elements 14 are formed on the end face of the main body 10 without a cutting element 12 being arranged at this position of the main body 10 termed the guide position. In this embodiment version, first the guide hole 16A is bored out to the final radius r3 in a preparatory separate process step before the boring bar 2 is then introduced. This is first introduced eccentrically with its guide elements 14 into the guide hole 16. Subsequently after centering the boring bar 2, the machining process of the other holes 16 then starts. Corresponding to the spacing distance a, the individual cutting elements 12 are therefore also separated relative to each other by a spacing distance a, in particular equidistantly from each other.

In contrast in the embodiment version according to FIGS. 5A-5C, a simultaneous machining of all holes 16 is enabled with only a single insertion of the boring bar 2. Consequently, preparation of a hole to form a guide hole 16A is unnecessary. The machining process in this context is in two steps, wherein in a first step, the guide hole 16A is first formed, and then in the second machining step, the other holes 16 are machined. More than one guide hole 16A can in principle always be formed. The guide hole 16A is formed here according to the so-called guide strip principle, such as for example is known with reamers.

In this regard, one of the working positions at which a cutting element 12 is arranged is simultaneously formed as a guide position so that a combined guide working position 32 is formed on the main body 10. This is characterized in that, at the same time, the guide elements 14 are also arranged at this position in addition to the cutting element 12. The guide elements 14 therefore start approximately at the axial position of the cutting element 12 and extend to the rear in an axial direction 4 over an axial length l. In this context, this guide working position 32 is usefully formed in the middle region 30 of the boring bar 2.

With the embodiment versions described here having a total of five bearing supports 18, this guide working position 32 is therefore associated with the third and hence the middle bearing support 18A. In contrast to the first exemplary embodiment according to FIGS. 1A, 1B, the individual cutting elements 12 are not distributed equidistantly in an axial direction 4. Instead, the middle cutting element 12A of the guide working position 32 is arranged in a leading position with respect to the spacing distance a in order to ensure that the middle bearing support 18A is machined first and a guide hole 16A formed. The middle cutting element 12A, starting from an equidistant arrangement, is therefore moved forward toward the next cutting element 12 approximately by the width of the bearing support 18A, and is simultaneously separated further from the following cutting element 12 to the rear by this distance. As can be seen in FIG. 5B, the deviation from the even distribution is somewhat less than the width of the bearing supports 18 so that the other cutting elements 12 are therefore already engaged when the middle cutting element 12A is still located in the guide hole 16A. At this time, the boring bar 2 is already supported by the guide elements 14 in the guide hole 16A.

The guide elements 14 in this embodiment version are also of decisive importance for a reliable concentric guidance of the boring bar 2 when machining the guide hole 16A. They therefore have to start substantially at the same axial height as the middle cutting element 16A.

Just as in the first exemplary embodiment, the axial length L of the guide elements 14 is dimensioned so that the main body 10 is supported for as long as the other cutting elements 12 are machining the holes 16. The axial length L is therefore greater than the axial extension of the bearing supports 18 and is typically also greater than the axial extension of the cutting elements 12; in particular, it is a multiple of the axial extension of the bearing supports 18 and/or the cutting elements 12.

Figure 6:
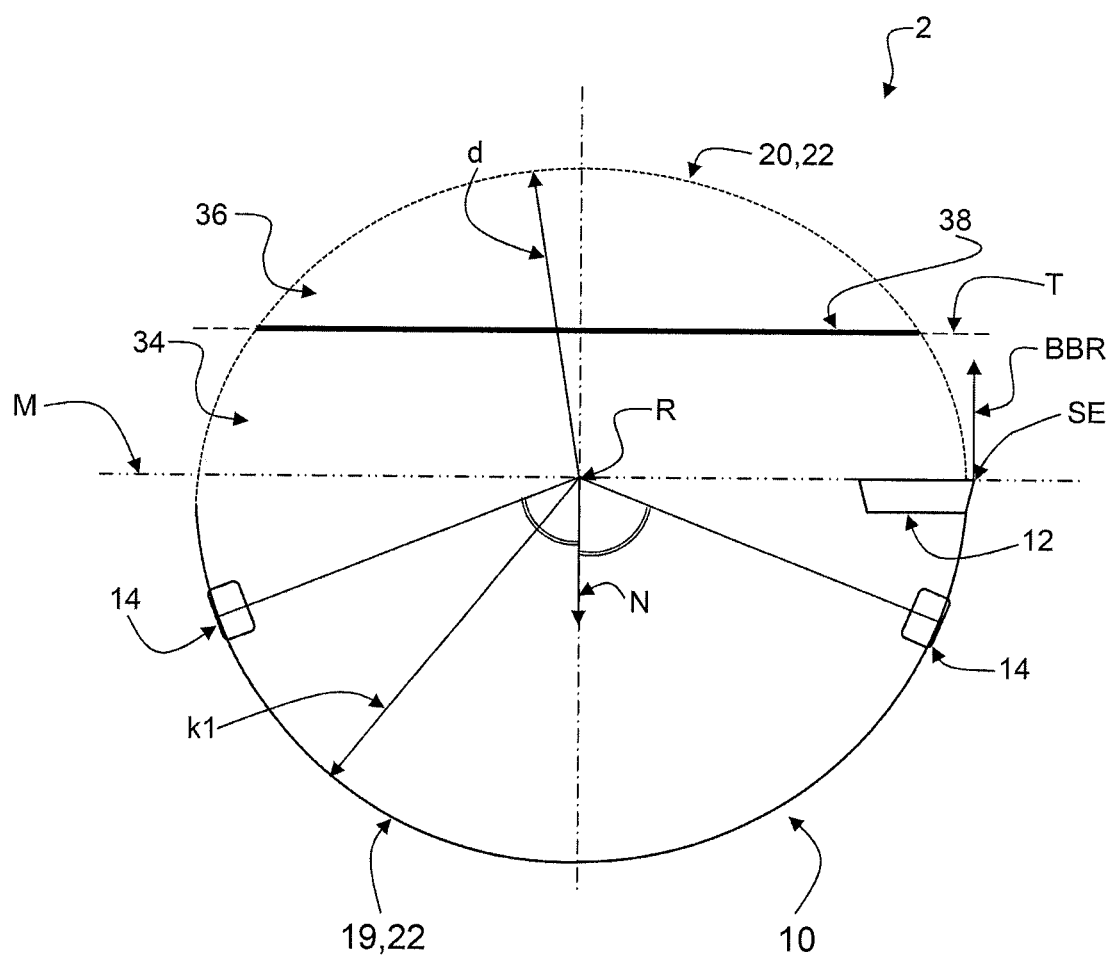

As can be seen in FIG. 6, the main body 10 is also divided into a basic body 34 and a balance element 36 attached thereto. The balance element 36 in this context is bonded by an adhesive layer 38 to the basic body 34, wherein the basic body in FIG. 6 is shown below, and the balance element 36 is shown above, the adhesive layer 38. Moreover, a screwed connection can also be additionally provided.

For this, the boring bar 2 is designed so that a parting plane T is formed between the basic body 34 and the balance element 36 which is oriented parallel to a midplane M that is established by the axis of rotation R and a cutting edge SE of a cutting element 12, i.e., the at least one cutting element 12. Each cutting edge SE in the exemplary embodiment is the radially outermost point of the blade of the cutting element 12, or more precisely the radially outermost point of the cutting element 12.

Moreover, the boring bar 2 according to FIG. 6 has two guide elements 14 and is designed so that a normal N to the parting plane T that runs through the axis of rotation R forms an angle bisector of the angle between the positions of the two guide elements 14. In this regard, the two equal-sized partial angles are indicated in FIG. 6 by a double-line curve. In this manner, inter alia a reliable concentric support of the boring bar 2 is achieved.

As can be seen in FIG. 6, the balance element 36 in this context, viewed in a cross-section, is designed as a circle segment, wherein the circle segment extends for example over an angular range between 40° and 180°. The balance element 36 extends here in an axial direction 4 and therefore has a partial cylinder lateral surface on the circumferential face. The attachment side or contact surface with the basic body 34 is preferably designed as a planar flat side and coincides in this case with the parting plane. Corresponding to the balance element 36, the basic body 34, viewed in a cross-section, is also designed like a circle segment. In this context, the basic body 34, viewed in a cross-section, assumes a greater cross-sectional area than the balance element 36.

By means of the balance element 36, an imbalance originating from the escape area 28 (in a homogeneous embodiment of the basic body 10) is at least partially compensated. For this, the balance element 36 consists of a material with a greater density than the basic body 34. The balance element 36 accordingly consists for example of heavy metal, whereas the basic body 34 consists of a lighter steel, in particular tool steel.

Consequently with a corresponding cutting tool, normally an undesirable deformation occurs during use, as is for example known with (thermo-) bimetallic strips. The special design of the balance element 36 and the basic body 34 described above ensures, however, that the deformation typically arising when using this cutting tool 2 causes a cutting edge SE, viewed in a cross-section, to shift substantially in a direction BBR perpendicular to the midplane M. Accordingly, it is ensured in particular that the corresponding cutting edge SE does not shift parallel to the midplane M and, viewed from the cutting edge SE, does not in particular shift radially in the direction of the axis of rotation R, Accordingly, what is effectively a specific deformation direction BBR is specified that in particular advantageously affects the precision of the boring bar 2.

Another particular advantage of the arrangement of the balance element 36 can be seen in its vibration-damping property. On the one hand, the use of the heavy metal has a positive effect on preventing vibrations. In addition, this vibration-damping property is supported by the adhesive bond by means of the adhesive layer 38. Kinetic and hence vibration energy can be absorbed via the adhesive layer 38 by means of internal friction effects. The kinetic energy is thereby absorbed, and any vibrations such as flexural or torsional vibrations are effectively dampened thereby.

Figure 7:
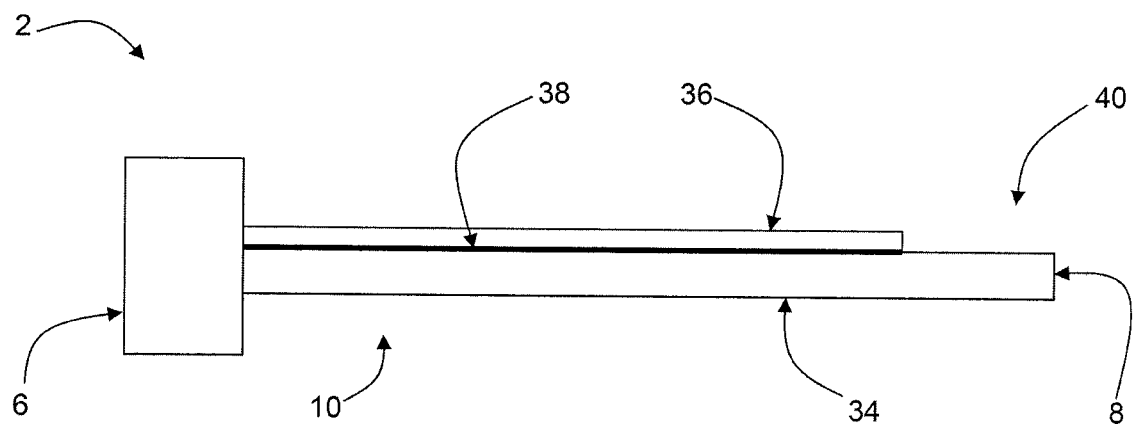

Another alternative embodiment version of the boring bar 2 is schematically reproduced in FIG. 7. In this version, the basic body 34 extends starting from the coupling 6 in an axial direction 4 up to the end face 8 at a free end 40 of the boring bar 2. The balance element 36 bonded to the basic body 34 contrastingly extends in an axial direction 4 only over a section of the basic body 34 and ends at a distance from the end face 8. Accordingly, the free end 40 of the boring bar 2 has no balance mass and consequently, the local center of mass of the boring bar 2 lies in the region of the free end 40 offset from the axis of rotation R. A centrifugal force then acts on the corresponding local center of mass during use of the boring bar 2, and consequently the boring bar 2 bends, wherein the free end 40 bends outward radially starting from the axis of rotation R and accordingly may be pressed against a hole wall 26. In this manner, a type of pretensioning is therefore realized that contributes to a secure seating of the tool, i.e., the boring bar 2 in the hole receiving it.

Figure 8:
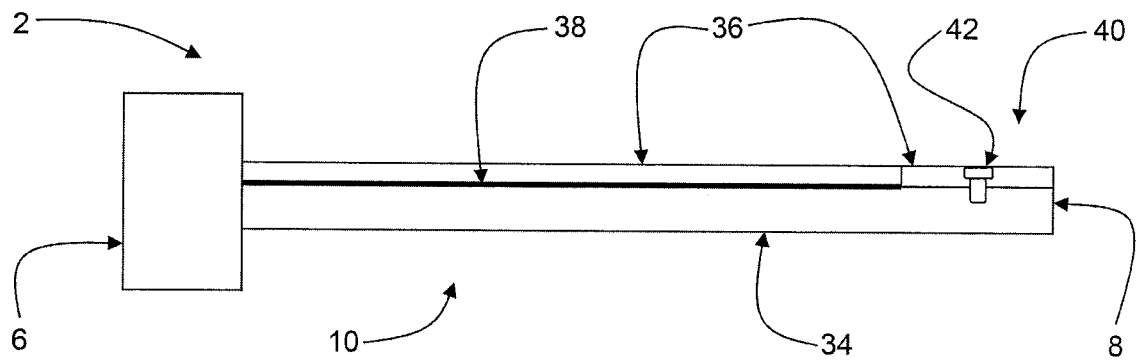

FIG. 8 furthermore schematically depicts a slight modification of this embodiment version of the boring bar 2. Here, the balancing mass 36 also extends over the entire length of the basic body 34 in an axial direction 4; however, this balance element 36 is designed in two parts, wherein a first part or a first partial section starting from the coupling 6 extends in an axial direction 4 up to the free end 40 of the boring bar 2, and wherein the second part or second partial section extends beyond the free end 40 and terminates at the end face 8. The first partial section in this context is unreleasably connected to the basic body 34 and is for example bonded thereto. The second partial section arranged on the free end 40 is in contrast releasably connected to the basic body 34, for example by screw 42. Accordingly, the second partial section of the balance element 36 can always be removed as needed to obtain a boring bar 2 according to FIG. 7 and exploit its special advantages.

For reasons of clarity, a depiction of the cutting elements 12 and guide elements 14 and a depiction of bearing supports 18 have been omitted in both FIG. 7 and FIG. 8.

The invention claimed is:

1. A cutting tool comprising a main body extending in an axial direction with an axis of rotation, with at least one cutting element having a cutting edge, as well as with a number of guide elements for guiding the main body within a guide hole, wherein
    the guide elements are separated from the axis of rotation by a guide radius,
    the main body, viewed in a cross-section, is divided into a functional region and an eccentric region,
    the at least one cutting element and the guide elements are arranged And distributed over the circumference of the main body over an angular region ($\alpha$) of less than 180° measured from the cutting edge of the at least one cutting element,
    the circumferential face of the main body in the eccentric region has a distance from the axis of rotation that is less in comparison with the guide radius,
    and
    the main body has a basic body as well as at least one balance element that is positioned within the eccentric region and is designed to at least partially balance an otherwise existing imbalance, and wherein
    a parting plane is formed between the basic body and the balance element which is oriented substantially parallel to within 10° of a midplane that is established by the axis of rotation and the cutting edge of the cutting element, and oriented substantially perpendicular to a deformation direction of the cutting edge.

2. The cutting tool according to claim 1, wherein two guide elements are provided, and a normal (N) to the parting plane that runs through the axis of rotation forms an angle bisector of the angle between the positions of the two guide elements.

3. The cutting tool according to claim 1, wherein the balance element is flush with the basic body on the circumferential face.

4. The cutting tool according to claim 1, wherein the balance element, viewed in a cross-section, is designed as a circle segment.

5. The cutting tool according to claim 1, wherein the balance element is bonded to the basic body.

6. The cutting tool according to claim 1, wherein the balance element and the basic body are made of different materials, and the material of the balance element has a greater density than the material of the basic body.

7. The cutting tool according to claim 1, wherein the main body is divided into at least two parts that are reversibly connectable with each other in an axial direction, and each of the parts has at least one cutting element and/or guide element.

8. The cutting tool according to claim 1, wherein the basic body extends starting from a coupling up to an end face on a free end in an axial direction, and the balance element only extends over a partial region of the basic body in an axial direction and terminates at a distance from the end face.

9. The cutting tool according to claim 1, wherein the basic body extends starting from a coupling up to an end face on a free end in an axial direction, and a partial section of the balance element arranged in a region of the free end is releasably attached.

10. The cutting tool according to claim 1, wherein the cutting tool is a boring bar for machining holes separated from each other in an axial direction by a set distance.

11. A method for machining a plurality of holes using a cutting tool according to claim 1.

12. The method of claim 11, wherein the cutting tool is a boring bar for machining holes separated from each other in an axial direction by a set distance.

13. The cutting tool according to claim 1, wherein the parting plane is within 5° of the midplane.

14. The cutting tool according to claim 1, wherein the parting plane is precisely parallel with the midplane.

* * * * *